(12) United States Patent
Boys

(10) Patent No.: US 7,032,025 B2
(45) Date of Patent: Apr. 18, 2006

(54) METHOD AND APPARATUS FOR MONITORING AND TRANSFERRING A CLIENT FROM A LOW PRIORITY ACCESS NUMBER TO A HIGHER PRIORITY ACCESS NUMBER DURING ACTIVE INTERNET AND OTHER WAN CONNECTION-SESSIONS

(75) Inventor: Donald R. Boys, Bella Vista, CA (US)

(73) Assignee: SoundStarts, Inc., Aromas, CA (US)

( * ) Notice: Subject to any disclaimer, the term of this patent is extended or adjusted under 35 U.S.C. 154(b) by 777 days.

(21) Appl. No.: 09/760,366

(22) Filed: Jan. 12, 2001

(65) Prior Publication Data

US 2002/0095474 A1    Jul. 18, 2002

(51) Int. Cl.
*G06F 15/16* (2006.01)

(52) U.S. Cl. ............... 709/227; 709/207; 709/237; 709/238; 709/239; 709/241; 370/217; 370/352; 370/401; 370/410; 370/467; 370/496

(58) Field of Classification Search ............... 709/227, 709/207, 237–239, 241; 370/217, 252, 401, 370/410, 467, 496, 494, 493, 357, 360; 379/355.01; 455/460

See application file for complete search history.

(56) References Cited

U.S. PATENT DOCUMENTS

| | | | | |
|---|---|---|---|---|
| 6,044,146 A | * | 3/2000 | Gisby et al. | 379/266.02 |
| 6,134,589 A | * | 10/2000 | Hultgren | 709/227 |
| 6,351,453 B1 | * | 2/2002 | Nolting et al. | 370/234 |
| 6,594,480 B1 | * | 7/2003 | Montalvo et al. | 455/401 |
| 6,606,668 B1 | * | 8/2003 | MeLampy et al. | 709/241 |
| 6,674,713 B1 | * | 1/2004 | Berg et al. | 370/217 |
| 6,738,824 B1 | * | 5/2004 | Blair | 709/238 |

* cited by examiner

*Primary Examiner*—Anthony Knight
*Assistant Examiner*—Thomas Pham
(74) *Attorney, Agent, or Firm*—Donald R. Boys; Central Coast Patent Agency, Inc.

(57) ABSTRACT

A network system is provided for enabling priority-based number switching from a lower priority access number to a higher priority access number during an active data session is provided. The system comprises, a CTI-switch for establishing call connections and performing call switching according to instruction, a network-hosted part of a software application for monitoring the current user-node connection states and the current states of the alternate access numbers, at least two network-access nodes connected to the network, the access nodes each accessible through dialing a network-access number from the user node and, a client-hosted part of the software application for listing access numbers, configuring priority states to the access numbers and for communicating the pertinent data to the network-hosted part of the software application. The system affects call transfer based on priority state.

42 Claims, 4 Drawing Sheets

METHOD AND APPARATUS FOR MONITORING AND TRANSFERRING A CLIENT FROM A LOW PRIORITY ACCESS NUMBER TO A HIGHER PRIORITY ACCESS NUMBER DURING ACTIVE INTERNET AND OTHER WAN CONNECTION-SESSIONS

CROSS REFERENCE TO RELATED DOCUMENTS

The present patent application refers to Document Disclosure number 456,418, entitled "Method and Apparatus for Enabling Transfer of Data-Packet-Network (DPN) Access Numbers While Connected", which was assigned a filing date of May 21, 1999, and which is incorporated herein in its entirety.

FIELD OF THE INVENTION

The present invention is in the field of Data-Packet-Network access protocols and pertains particularly to methods and apparatus for enabling a dynamic transfer from a low-priority connection to a higher-priority connection during an active session on a wide-area-network (WAN).

BACKGROUND OF THE INVENTION

A data-packet-network (DPN) is a system of connected computer nodes that are able to share and serve data. A user operating one of the connected nodes on such a network is generally able to share data with and retrieve data from any of the other data processing and serving nodes connected to the same or to another connected network.

The largest scale example of a DPN is the well-known Internet network. The Internet network comprises a plurality of connected networks and sub-networks and is, geographically speaking, the largest publicly available DPN in existence. Any person with an Internet-capable appliance and a telephone line may connect to the Internet using a dial-up technique that employs the dialing services of a computer modem, which may be an external device or an internal "soft" modem implementation.

The largest body of users that routinely access the Internet do so using a dial-up/modem method. An Internet service provider (ISP) typically provides the actual connection between a user's Internet appliance and the Internet. The basic process starts with a user initiating Internet connection software installed on his or her Internet appliance. The connection software has one or more Internet access telephone numbers, typically made available by the ISP, configured therein for the purpose of attaining network access through a normal telephone line.

Generally speaking, there is one or at most a few local telephone-access numbers provided by an ISP for most small to medium-size municipal locations. However, a host of other available access numbers, which represent long distance numbers for a given user, may be made available as a list of possible ISP numbers that may be used and configured into connection software. As a matter of priority, a user will configure a local number or numbers into Internet connection software as first and second numbers to use when attempting to connect. It is often an experience of a user that all local access-numbers for his or her Internet service are notoriously busy at certain periods of each day. This problem is generally caused by a limited number of modems at a local ISP being used by a large pool of users.

In some cases, telephony limitations in capacities of local switches in the local telephone network may contribute to the problem of attempting to connect to a local ISP. This may be the case if there are a large number of individuals continually re-trying busy ISP numbers. This effect acts as a virtual pool or queue of callers with only one successfully connecting when one connected user drops off and a modem becomes available.

An alternative to waiting for a local ISP access number to become available is to use a back-up number to another ISP location. Often, these numbers are long distance numbers. A common situation that occurs for many users operating in medium to small municipalities, or from rural areas, is that the local numbers are very often busy while back-up long distance numbers offer more assured access probability. This is especially true when the back-up number is to an ISP located in a more metropolitan area having better infrastructure.

Some small ISPs are local only to a particular community and do not have numbers available for other ISP access locations. However, most large providers offer many numbers that connect to a plurality of regional ISP locations. A user forced to use a long distance backup number will generally limit his or her Internet activity because of the incurred charges for long distance access. This can be very frustrating for a user that lives in a location wherein local numbers are busy more often than not.

What is clearly needed is a method and apparatus that enables automated transfer of a WAN-connected client from a low priority access number to a higher priority access number while the client is still in session. Such a method and apparatus would enable a client to start a session using a low priority number (backup) and be reasonably assured that he or she will soon be switched to a higher priority number.

SUMMARY OF THE INVENTION

In a preferred embodiment of the present invention, a network-based hardware and software system is provided for enabling priority-based number switching from a lower priority access number to a higher priority access number during a data session through monitoring current connection states of a user node connected to the network during session and comparing those states with current states of known alternate access numbers available to the user node during the network session. The network-based hardware and software system comprises, a CTI-switch for establishing call connections and performing call switching according to instruction formulated through the monitoring, a network-hosted part of a software application for monitoring the current user-node connection states and the current states of the alternate access numbers and for directing the CTI-switch function based on results of the monitoring, at least two network-access nodes connected to the network, the access nodes each accessible through dialing a network-access number from the user node and, a client-hosted part of the software application for listing access numbers, configuring priority states to the access numbers, and for communicating the pertinent data to the network-hosted part of the software application.

A user connected to the network using a lower priority access number may continue the network session while a higher priority access number available to the user's node is identified from a list of alternate numbers through the monitoring performed by the network-hosted software application during the session, the identified number, also identified as currently accessible to the user's node, is either secured by the CTI-switch on behalf of the user, the user's node then disconnected and then re-connected to the secured number, or rendered to the user in a network notification after which, the user may manually disconnect and then re-connect to the available number.

In a preferred embodiment, the network accessible through the access numbers is the Internet network, which is accessed through a telephony network. In this embodiment, the telephony network is the public-switched-telephony-network (PSTN). In one aspect, the priority characteristics of the access numbers include at least the access and connection costs of using the numbers. Also in this aspect, the lowest cost access number retains the highest priority, the priority ratings graduating down for each access number in a list of numbers, the highest cost access number retaining the lowest priority. In the same aspect, access numbers costing the same or exhibiting a negligible difference in cost retain a same priority rating.

In another aspect, the priority characteristics of the access numbers include bandwidth characteristics of the associated network-access nodes. In this aspect, a network-access number associated with a network-access node performing at higher bandwidth retains higher priority rating. In still another aspect, priority characteristics for a network-access number include both cost characteristics and bandwidth characteristics of the associated network-access server node. In one application, the network-hosted part of the software application is hosted at the CTI-switch. In this application, the client-hosted part of the software application communicates to the network-hosted part of the software application through a telephone-access number and interactive-voice-response interaction.

In another application, the network-hosted part of the software application is hosted by network-connected server node. In this application, the network-hosted part of the software application communicates to the CTI switch through a network interface. Also in this application, the network-hosted part of the software application communicates with the client-hosted part of the software application through an Internet path using Internet Protocol.

In another aspect of the present invention, a software-control application is provided for enabling priority-based number switching from a lower priority access number to a higher priority access number during a data session conducted by a user connected to a data-packet-network through one of a list of available access numbers. The software-control application comprises, a network-hosted part of the software application for initiating and directing the priority-based number switching based on monitored results, a client-hosted part of the software application for configuring at least one access number list including associated priority characteristics and communicating the listing characteristics to the network-hosted part of the software application and a network-communication path between the client-hosted part of the software application and the network-hosted part of the software application, the network-communication path enabling bi-directional communication between the parts of the software application. A user engaged in a data session on the data-packet-network using a lower priority access number may during the session be switched according to software instruction from the lower priority access number to an identified higher priority access number during the same session without manual intervention required of the user.

In a preferred embodiment, the data-packet-network is the Internet network. Also in a preferred embodiment, the user utilizes a personal computer for Internet connection using dial-up modem software. In one aspect, the network-hosted part of the software application is hosted on a CTI telephony switch. In this aspect, the network-hosted part of the application includes modules for monitoring a user connection, for storing and presenting a list of ISP-access numbers, for determining higher priority from the list, and for instructing the CTI telephone switch.

In another embodiment, the network-hosted part of the software application is hosted on a network-connected server. In this aspect, the network-hosted part of the software application includes modules for monitoring a user connection, for storing and presenting a list of ISP-access numbers, for determining higher priority from the list, for simulating an out-bound dialer, for Internet communication, for Internet navigation, for user notification, and for ringing-event detection. In this aspect, the network-hosted part of the application controls CTI switch function through a network gateway.

In another aspect, the client-hosted part of the software application communicates to the network-hosted part of the software application through a telephone-access number and interactive-voice-response interaction. In one embodiment, the network-communication path is established through a telephony network using connection-oriented-switched-telephony lines. In another embodiment, the network-communication path is established through the Internet using Internet Protocols.

In another aspect, a method for detecting an available higher priority access number from a list of known numbers and switching the computerized node to the higher priority number during a data session conducted on a data-packet-network is provided. The method comprises the steps of, (a) connecting the computerized node to the network using a lower priority number included in the list of known numbers, (b) identifying the current lower priority number in the list of known numbers, (c) comparing the priority assignment of the lower priority number with a priority assignments of other numbers in the list of known numbers, (d) identifying one or more higher priority numbers contained in the list of known numbers, (e) monitoring the identified higher priority numbers for connection availability and (f) upon detecting an available higher priority number, switching the current data session to the higher priority number.

In a preferred application, the data-packet-network is the Internet network. Also preferred in step (a), the computerized node is a personal computer accessing through an Internet Service Provider (ISP) and the list of access numbers comprise available alternative ISP numbers. In on aspect in step (a), the listed access numbers represent numbers generic to more than one ISP.

In one aspect of the method in step (b), identification is performed in a CTI telephony switch by CTI software. Alternatively in step (b), identification is performed in an Internet server by server software. In the aspect using CTI software in step (c), comparison is performed by the CTI software associated with the CTI telephony switch. Alternatively in step (c), comparison is performed by the server software associated with the Internet server.

In the CTI aspect in step (d), identification is performed by CTI software associated with the CTI telephony switch. Alternatively in step (d), identification is performed by the server software associated with the Internet server. In preferred implementation, the priority states of each listed access number equate with cost of connection and operation of each number from the location of the personal computer. Also in preferred implementation, in step (e), monitoring includes calling the higher priority numbers periodically, the calls placed from the CTI telephone switch.

In one aspect, in step (e), monitoring includes calling the higher priority numbers periodically, the calls placed from a CTI telephony switch and initiated from within the Internet server, the server communicating with the switch through a network gateway. In another aspect, in step (e), monitoring includes accessing connection servers associated with the higher priority access numbers, the connection servers providing availability status of the associated number. In this aspect, in step (e), the monitoring is performed by the server software associated with the Internet server.

In another aspect using server software in step (f), notification is sent to the personal computer upon detecting a higher priority number and switching is performed according to user response, the switch receiving instruction from the server software.

Now, for the first time, a method and apparatus that enables automated transfer of a WAN-connected client from a low priority access number to a higher priority access number while the client is still in session is provided. Such a method and apparatus enables a client to start a session using a low priority number and be reasonably assured that he or she will soon be switched to a higher priority number.

BRIEF DESCRIPTION OF THE DRAWING FIGURES

DESCRIPTION OF THE PREFERRED EMBODIMENTS

According to a preferred embodiment of the present invention, a dynamic system for transferring a Data Packet Network (DPN) connection from a lower-priority connection to a higher-priority connection during an active session on a wide-area-network (WAN) through an Internet Service Provider (ISP) is provided. Such a system provides automated transfer of a WAN-connected client from a low priority ISP access number to a higher priority ISP access number while a user is in session without interruption of on-line activities. Such a method and apparatus provides a user a capability to start a session using a low priority ISP number and to be reasonably assured that he or she will soon be switched to a higher priority ISP number. The methods and apparatus of the present invention is described in enabling detail below.

Figure 1:
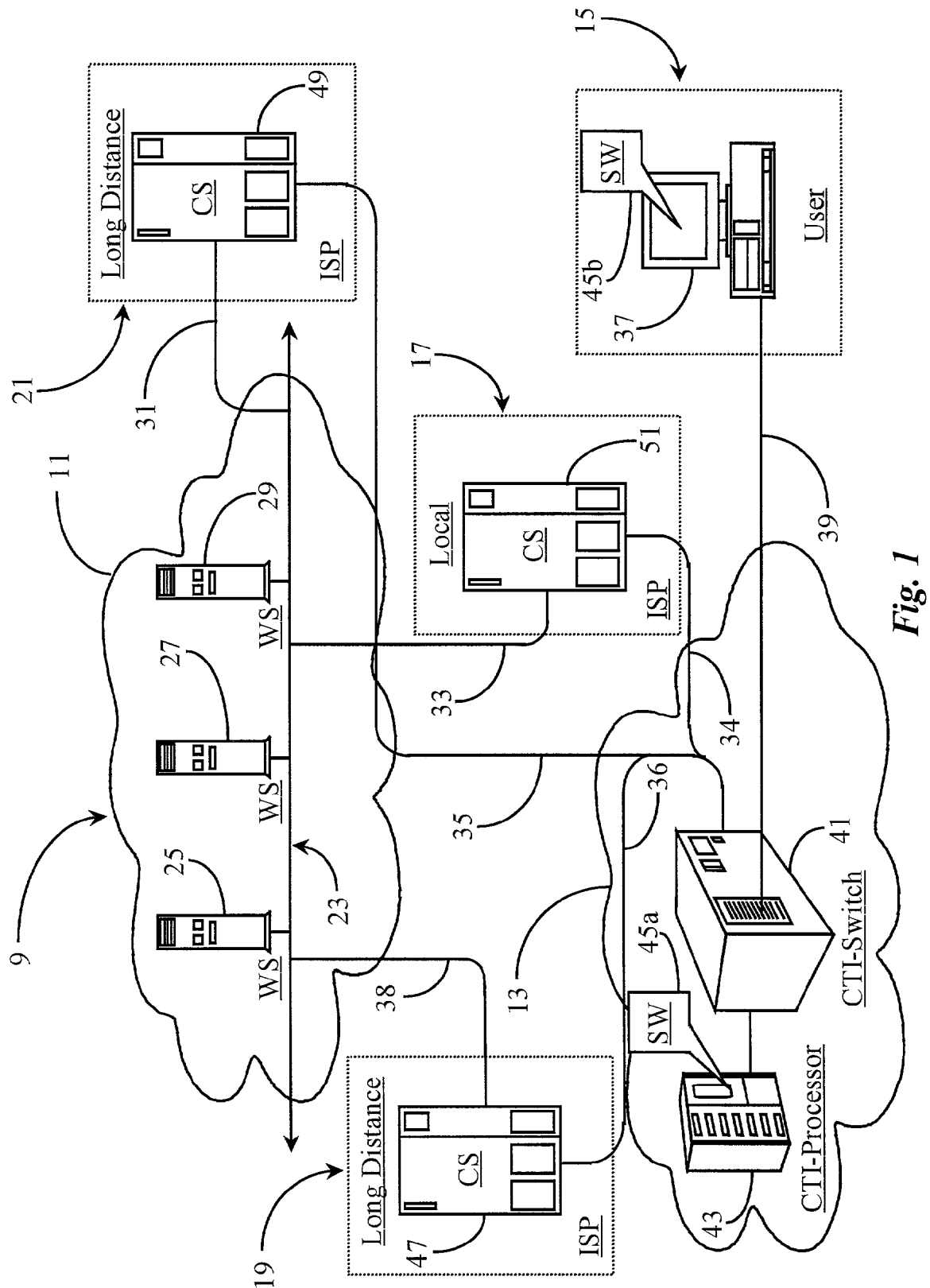
FIG. 1 is an overview of an Internet connection and priority-transfer process according to an embodiment of the present invention.

FIG. 1 is an overview of a communication network 9 wherein an Internet connection and priority-transfer system is implemented and practiced according to an embodiment of the present invention. Communication network 9 comprises a plurality of ISP locations 17, 19, and 21, a DPN 11, a telephony network 13, and an exemplary user premise 15.

DPN 11 is the well-known Internet network in this example and will hereinafter be referred to as Internet 11. Internet 11 is represented herein by a network cloud icon through which is illustrated an Internet backbone 23. Internet backbone 23 represents all of the lines, equipment and connection points that make up the Internet network as a whole. Therefore there are no geographic limitations to the practice of the present invention.

A plurality of Web servers 25, 27, and 29 are illustrated within Internet 11 and in a state of connection to backbone 23. Web servers 25–29 are adapted as Internet file servers as are known in the art. Servers 25–29 typically serve what are known as electronic information pages or Web pages as are known in the art. Servers 25–29 represent any Internet-hosted file server accessible from a remote location using standard Internet connection technologies. It will be appreciated by one with skill in the art that in actual practice there are a limitless quantity of servers 25–29 hosted on Internet 11.

ISP service locations 17, 19 and 21 are geographically disparate locations adapted for providing Internet-connection services as are generally known in the art. Service is enabled from each ISP service location by illustrated Internet-connection servers (CS) illustrated herein as (CS) 51 (within ISP location 17), CS 47 (within ISP location 19), and CS 49 (within ISP location 21). In this example, it is assumed that ISPs 17, 19, and 21 are all hosted by a same entity providing Internet services by contract. ISP location 17 represents a local access entity to user premise 15. ISP location 19 represents a long distance entity and ISP location 21 represents yet another long distance entity to user premise 15. The above-described distance parameters are in relation to the geographic location of user premise 15 in relation to each location (17, 19, and 21) in terms of telephony regulation involving geographic local and long distance zoning as implemented by a telephone service provider. For example, ISP location 17 may be accessed from user premise 15 using a local telephone number. Both ISP locations 19 and 21 may be accessed from user premise 15 using long distance telephone numbers.

Considering ISP locations 19 and 21, it may be assumed that one of them is further remote (geographically) from user premise 15 than is the other, so one would have a higher priority for user premise 15. That is to say that from user premise 15, a call placed to one of ISP locations 19 or 21 will cost more money than a call placed to the other. Logically then a call placed to ISP location 17 from user premise 15 would be least expensive and typically free (included in basis monthly billing rate) to a user operating from premise 15.

Telephony network 13 is a well-known public-switched-telephone-network (PSTN) in this example and will hereinafter be referred to as PSTN 13. PSTN 13 comprises all of the known equipment and connections making up the PSTN as a whole. Illustrated within PSTN 13 is a telephony switch 41 connected to an external computerized processor 43. Switch 41 is computer-enhanced by way of computer-telephony-integration (CTI) and is therefore termed a CTI-switch as so labeled. Connected processor 43 provides the above-described enhancement and is therefore termed a CTI-Processor as so labeled. It is CTI processor 43 that provides CTI enhancement to switch 41. Such enhancement provides specific intelligent capabilities to switch 41 that otherwise would not be available. Many such capabilities are well known in the art and therefore will not be greatly detailed. CTI enhancement of switch 41 is complimented with an instance of software (SW) 45a installed on controlling processor 43. Detail regarding the function and capability of SW 45a is provided later in this specification.

User premise 15 comprises a personal computer (PC) 37 and an instance of software (SW) 45b installed on PC 37.

Premise 15 represents any physical premise of a user having equipment (PC) capable of Internet connection and navigation. Premise 15 may be a home, an office, or a mobile premise capable of Internet connection through wireless technology. In this example Internet connection to backbone 23 within cloud 11 from premise 15 is enabled by a dial-up modem technique most common in the art. However, it will be appreciated by the skilled artisan that there are a variety of other connection technologies, any one of which may be used. Internet software is not illustrated on PC 37 in this example for the purpose of clarity.

In practice of the invention, access to Internet 11 and subsequently to any of Web servers 25-29 is initiated from PC 15 over an Internet-access line 39 to CTI switch 41, and preferably through ISP location 17 over an exemplary telephony trunk 34. ISP location 17 is preferred because of the fact that it is local and requires no long distance fees for access and connection. It is important to note herein that PC 15 may be another type of Internet-capable appliance as long as Internet connection may be achieved and Internet navigation may be practiced therefrom while connected. Methods of the present invention may be practiced using such devices as a laptop computer, a stand-alone hand-held computer, an IP telephone, or a WEB-enabled cellular telephone. As such, the exact connection means and equipment may vary according to device requirements. The inventor chooses to illustrate standard dial-up connection using a PC for reasons of familiarity and because it is most common.

As described generally in the background section, it may be that in this example, ISP location 17 may be unavailable to premise 15 at the time of connection initiation because it is fully engaged. In this case, a user operating from premise 15 would have to attempt connection through either ISP 19 or ISP 21 (long distance access numbers). These options are typically provided with any major Internet connection software. In some cases, a connection software package will automatically try a long distance location in the event of a busy signal at a local number if the particular long distance number is configured as a backup.

In this example, if ISP location 17 is busy, then a user operating from premise 15 may, according to current art, attempt to connect to ISP location 19 via line 39 through switch 41 and over a telephony trunk 36. Alternatively, he or she may attempt to connect to ISP location 21 via line 39, through switch 41 and over a telephony trunk 35. The access numbers of locations 17, 19, and 21 may be assigned priority according to cost-of-call and connection. For example, ISP location 17 would be a highest priority number, ISP 19 may be a second priority number, and ISP location 21 may be a third priority number. A problem in current art is that if ISP location 17 is unavailable, then a user operating from premise 15 must pay long distance telephone charges if he or she decides to connect using either of the lower priority access numbers.

According to an embodiment of the present invention, SW 45b installed on PC 37 works in cooperation with SW 45a on processor 43 to enable a priority profile and transfer service utilizing CTI switching and processing capability of switch 41. The function of this novel service is to implement a priority number monitoring and transfer function on behalf of a user operating premise 15 and attempting to connect to Internet 11. The service of the present invention, in this embodiment, may be offered through a telephone service provider. In another embodiment, the service may be offered through any ISP.

The software of the present invention keeps a priority number profile of available connection numbers provided to the user of premise 15 by his or her ISP entity. In this example there are three telephone numbers, one for ISP location 17 (highest priority), one for ISP location 19 (second priority), and one for ISP location 21 (lowest priority). SW 45a directs CTI switch 41 to place a call to any of the available access numbers that premise 15 is not connected to if those numbers are a higher priority than an access number the user is currently connected to during a session. If one of the monitored numbers becomes available, then the service will transfer the user to the higher priority number by connecting to the higher priority number, and re-connecting the user to the number while disconnecting the user from the lower priority number. The service of the present invention operates automatically without requiring a user to manually disconnect and re-connect to Internet services service.

If a user operating from premise 15 is already connected to the highest priority number (local ISP 17), then SW 45a remains idle. The goal of the present invention is, in the case of a lower priority connection, to transfer the user to a higher priority connection while a user is in session and navigating Internet 11. A user may be reasonably assured that long distance charges incurred by connection and session durance using a lower priority number will be lowered if not eliminated during session within a reasonable time period. Such a time period will of course depend in part on telephony traffic at the higher priority numbers and upon the fortune of switch 41 actually establishing a connection to a higher priority number for transfer. More detail about the function of SW 45a and b will be provided below.

Figure 2:
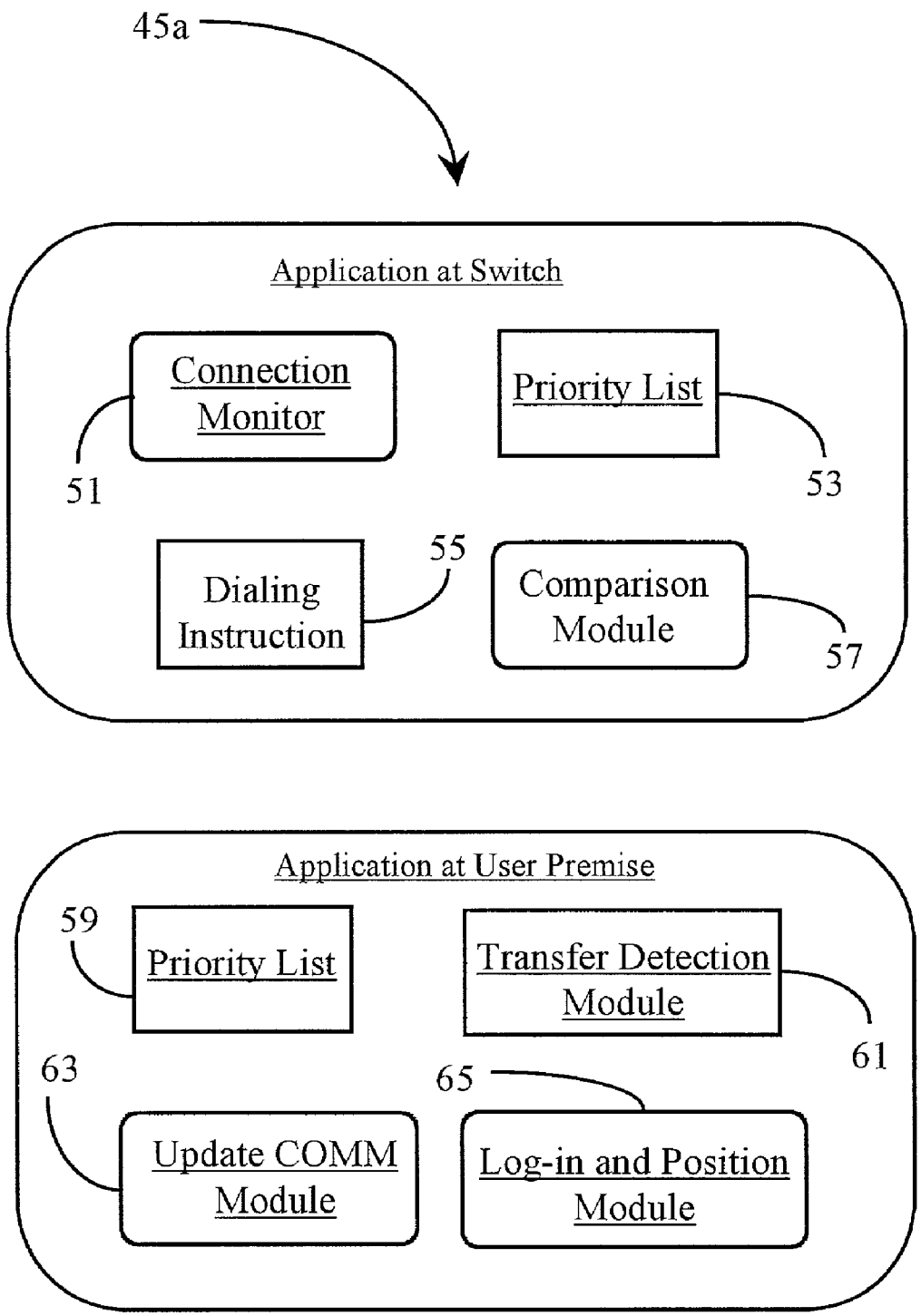
FIG. 2 is a block diagram illustrating a CTI-enabled priority access application according to an embodiment of the present invention.

FIG. 2 is a block diagram illustrating a CTI-enabled priority access distributed application SW 45a and SW 45b according to an embodiment of the present invention. SW 45a is resident and executable from a CTI-enabled switch analogous to switch 41 of FIG. 1, the software residing on processor 43 as was illustrated therein. SW 45a comprises a connection monitor module 51, a priority list 53, a dialing instruction module 55, and a comparison module 57. Together the above-described modules function to monitor a user's connection, check availability states of any higher-priority ISP numbers which are of a higher priority than a user's current connection, and to transfer the user to a higher priority number if one is found and available.

Connection monitor module 51 checks a user's current session-connection number (immediately after log-in) against priority list 53, which contains all of the user's listed connection numbers for a particular ISP used to access the Internet. Priority list 53 is established by a user and is based on various factors, including but not necessarily limited to, user availability of local and long distance ISP access numbers, a user's experience of the quality and busy-signal profile of any given number, and telephone rates for one's own municipality, next nearest municipality, and long distance services of one or more long distance service providers. A user may simply assign a priority level to numbers listed using any one of many types of rating codes.

Comparison module 57 compares the priority rating of the current connection with the other rated numbers contained in list 53. If there are one or more numbers found that are rated a higher priority than the connected number they are noted and passed to dialing instruction module 55. Module 55 instructs the associated CTI switch (switch 41 FIG. 1) to periodically dial the higher priority numbers while the user is still in session using the current connected number. If a higher priority number is successfully accessed during this repeated procedure then the associated CTI switch is instructed to connect the user to the higher priority number and to terminate the user's current session.

Dialing instruction module 55 has access to ISP access numbers established in priority list 53 and any necessary mechanical instruction elements for out-dialing. Out-dialing may follow one or more of many protocols such as disabling call waiting features, dialing "0" or "1" for long distance access, telephone calling card or credit card billing and so on. In a preferred embodiment out-dialing and transfer is made according to conference calling protocol wherein a higher priority number is secured in terms of connection before a user is disconnected from a current session and transferred. In another embodiment, a user may be disconnected from a current session upon establishing a ringing event wherein transfer is accomplished during the ringing event.

SW 45b resides in a user's PC analogous to PC 37 of user premise 15 of FIG. 1. SW 45b comprises a priority list 59, a transfer detection module 61, an update communication (COMM) module, and a log-in and position module 65. Priority list 59 is analogous to list 53 of SW 45a except when it is updated and not yet communicated to the service. The service of the present invention is invoked whenever a user makes a connection to one of the numbers contained in list 59.

In one embodiment, a user may have more than one ISP configured to the service. In this case, there would be more than one priority list. COMM module 63 enables instruction to be passed from SW 45b to SW 45a over normal telephone lines. For example, if a user updates a priority list of numbers, then upon connection to the appropriate CTI switch, the updated information may be passed to a connected CTI processor analogous to processor 43 of FIG. 1. In this case, CTI-processor 43 of FIG. 1 is capable of using switch 41 to pass information back and forth from a connected user. This may be accomplished using IVR capability, touch-tone capability, or by other known methods. In one embodiment, a service number is accessed momentarily before a user is connected to his or her dialed ISP number. The service number may be used to collect any updated information a caller may have. It is assumed in this example that CTI-switch 41 of FIG. 1 is capable by way of software of automatic out-dialing to any destination number provided.

In another embodiment, a third-party service number may be provided to users of the service and accessed for updating purposes in-between session activity. In this case, a third party service can update software in processor 43 of FIG. 1 with information collected from users. Transfer detection module 61 detects when a telephone transfer has occurred and can inform a user via pop-screen appearing on a user's display monitor that he or she is currently being transferred to a new higher priority access number. This may be practiced so that a user does not suspect any other type of disconnect state such as when an ISP service arbitrarily bumps a user from connected state. Once connected, a log-in dialog box appears asking a user for log-in information. This is different from prior art protocol in that the user is connected before providing the log-in information required for authentication. If a user's password and user-name information is available through automated software process, it may be provided automatically at re-connection.

The experience on a user's side during transfer is that browser activity commenced during the original session is temporarily stalled. Log-in and position module 65 notes the network path of the current navigation-state of a user's browser during transfer to a new access number. The noted browser position is re-attained after successful log-in to the higher priority number. If log-in is not performed automatically during a connection transfer at network level, then log-in and position module 61 can provide automated log-in by remembering the correct user name and password. If a user was engaged in the download of software or other data during the time of connection transfer, then he or she may have to begin a new download procedure after transfer. However, a software application known in the art and available to the inventor can be provided at the user's end to pick up a download from where it was terminated.

Figure 3:
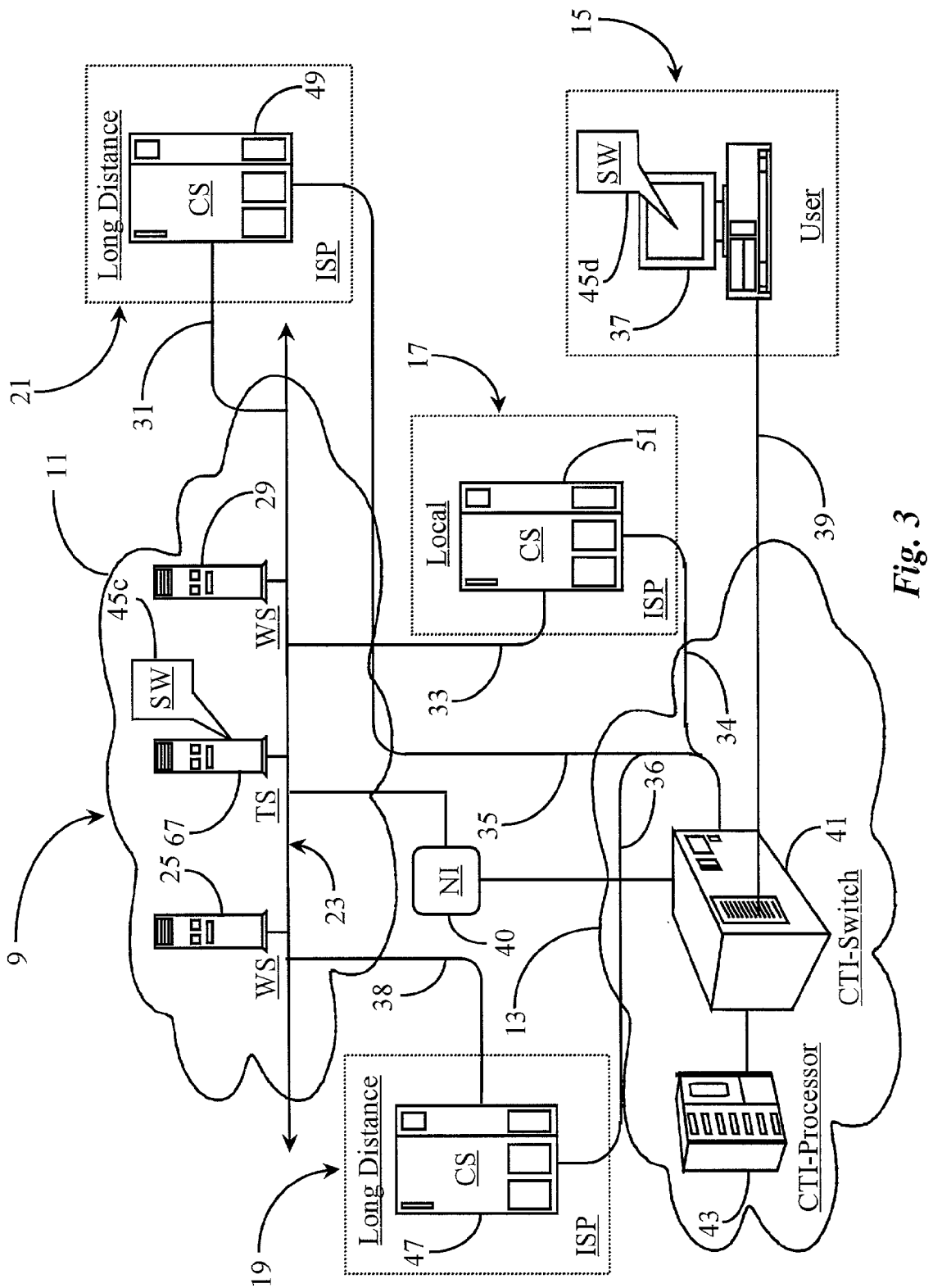
FIG. 3 is an overview of an Internet connection and transfer process according to an alternative embodiment of the present invention.

FIG. 3 is an overview of communication network 9 wherein an Internet connection and priority-transfer process is practiced according to an alternative embodiment of the present invention. Communication network 9 is essentially analogous to the example illustrated in FIG. 1. Therefore, detailed re-description of identical elements comprising network 9 will not be provided in this example. In this embodiment a transfer server (TS) 67 is provided to enable Internet monitoring of user connections and priority numbers. TS 67 is adapted as a transfer server capable of automated out-dialing into PSTN 13 by way of a network interface (NI) 40. NI 40 is a network bridge or gateway enabling data-network-telephony (DNT) calls to be placed from TS 67 into PSTN 13. An instance of software 45c is provided on TS 67 and adapted to function essentially as SW 45a of FIG. 1. An instance of SW 45d is provided to run on PC 37 in place of SW 45b of the embodiment of FIG. 1. In this embodiment TS 67, connected to backbone 23 within Internet 11, hosts SW 45c which works in conjunction with SW 45d on PC 37 to effect status monitoring and transfer service between ISP numbers.

In this alternative preferred embodiment, a user operating from premise 15 accesses Internet 11 via access line 39, switch 41 and any of ISP locations 17–21 as previously described in FIG. 1. Preferably, access is successfully completed through local ISP location 17 via trunk 34 and pipeline 33 onto backbone 23. However, in the event that a user must choose an alternate lower priority access number such as ISP location 19 or ISP location 21 because of a persistent busy signal at location 17, access is forged through the appropriate and associated paths.

Assume that local ISP location 17 is unavailable and a user operating from premise 15 has accessed Internet 11 through, for example, ISP 21 described as the lowest priority access location in FIG. 1. Once connected through location 21, TS 67 is notified either by CTI-switch 41, or by CS 49 of the connection. Notification of connection may include but is not limited to user ID, ISP destination number accessed, origination number identification, and identification of the network switch hosting the connection, in this case, switch 41. In the first case of notification described above, there may be a small SW instance (not shown) installed at processor 43 that is adapted to instruct switch 41 to place a call to TS 67 through NI 40 at the time of connection notifying TS 67 of the established user connection and pertinate information about the connection. In the second case, CS 49 at ISP location 21 simply sends a data notification over line 31 and backbone 23 to TS 67. Such notification may be in the form of an instant message or other DNT data transaction.

SW 45c is enhanced for Internet operation in that in addition to the modules described with regard to SW 45a of FIG. 1, SW 45c has further modules enabling out-bound dialing, Internet navigation, ring detection, and user notification. SW 45c is enhanced with capability over that described with regard to SW 45*b* of FIG. 1 in that direct Internet communication between a user operating PC 37 and TS 67 is enabled for purpose of updating and user notification.

The end goal of this embodiment is essentially the same as in the embodiment of FIG. 1, albeit Internet enhanced. While a user is connected to Internet 11 through ISP location 21 (lowest priority), TS 67 by virtue of SW 45*c* identifies any higher priority access numbers from an accessible list of numbers, in this case, stored at TS 67. Once the higher priority numbers are identified, in this case, locations 19 and 17 in respective order from next highest to highest priority, TS 67 periodically dials these numbers through NI 40 and, in this case switch 41. In this case, it is required that switch 41 is accessed for out-dialing because a transfer would have to take place within switch 41, which hosts the user's current connection.

In another embodiment under the same connection situation described above, TS 67 periodically monitors the connection servers of each higher priority location, in this case CS 47 and CS 51 through Internet paths enabled by backbone 23 and line 38 (CS 47) and backbone 23 and line 33 (CS 51). In this case, the current modem-availability states are known by each server through software monitoring of respective modem banks (software not shown). In this way, TS 67 may determine if either ISP location is busy or available without having to call any access numbers.

In one aspect of the just-described theme, upon determining that a higher priority ISP location is available, TS 67 sends an instant notification to the user operating PC 37. Such a notification may be a pop-up screen telling the user that a particular number is now available. At this point, the affected user may manually log-off and reconnect to the suggested number.

In another embodiment following the same theme described above, a user operating PC 37 receives the instant notification from TS 67 and responds to the notification giving TS 67 permission to call the target access number and instruct switch 41 to disconnect the user from his or her current session and re-connect him or her to the higher priority number. In this case, TS 67 functions in much the same way as CTI-processor 43, controlling the switch from a remote Internet location through NI 40.

The order of priority monitoring can be configured by a user to some extent. For example, ISP locations 21 and 19 may be such that the long distance charges for using both numbers is the same or the difference is negligible. In this case, both locations may hold a same priority rating with location 17 being the highest priority. In one embodiment, more than one configured ISP having plural access numbers may be included in monitoring such that if a user is continually frustrated with one ISP entity (busy high priority numbers), then numbers generic to another ISP entity may be included in a priority monitoring scheme during one data session.

It will be apparent to one with skill in the art that an Internet-based service while achieving the same basic goal as the PSTN-based service of FIG. 1 is more versatile and may be provided by virtually any third party. There are many possibilities.

Figure 4:
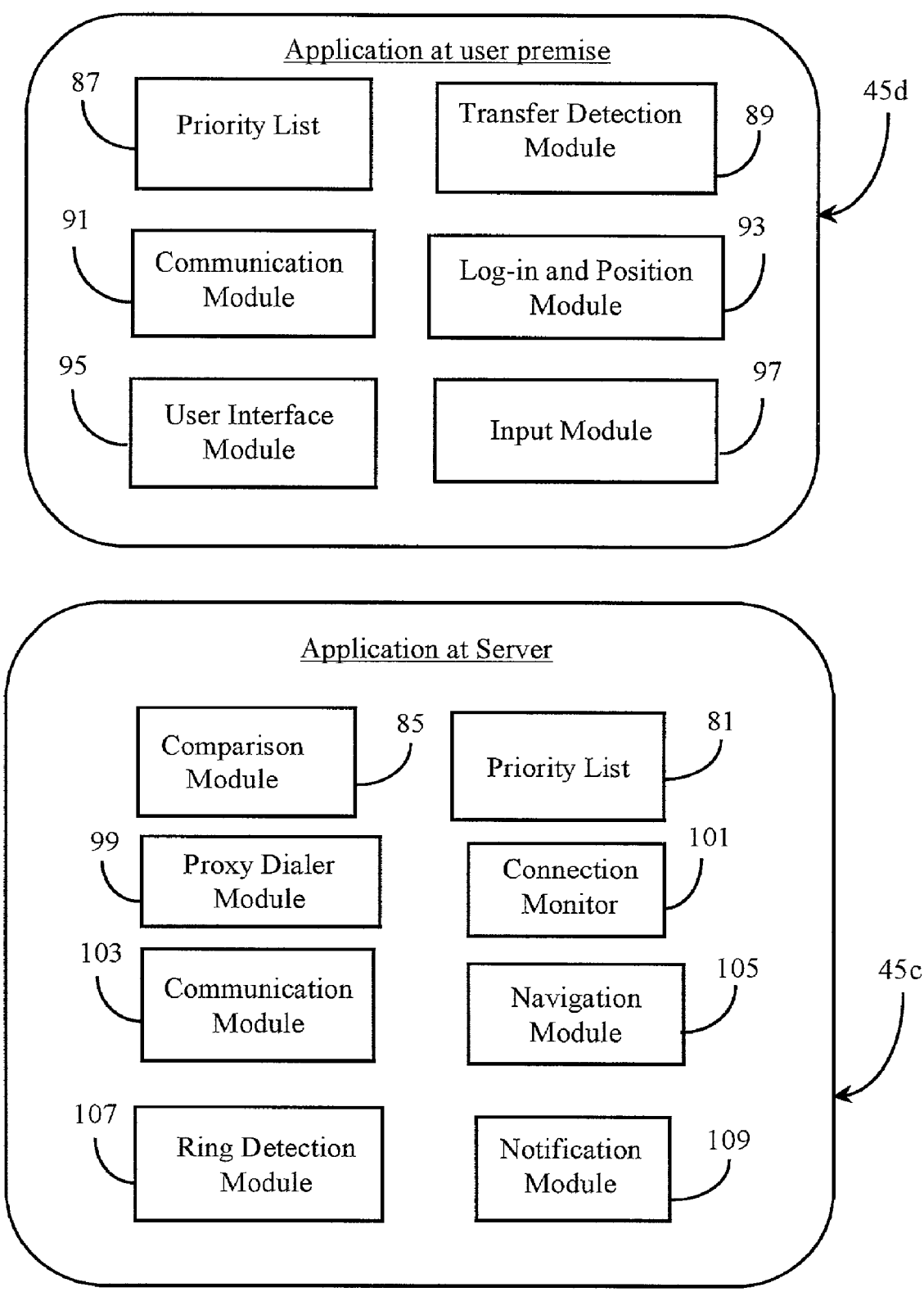
FIG. 4 is a block diagram illustration of an Internet-enabled priority-access application according to another embodiment of the present invention.

FIG. 4 is a block diagram illustrating a CTI-enabled priority access application SW 45*c* and 45*d* according to the embodiment of FIG. 3. SW 45*d* is resident in a user's PC analogous to PC 37 of FIG. 3. SW 45*c* is resident in TS 67 within Internet 11 of FIG. 3.

Referring now to SW 45*d*, there are a plurality of functional modules provided therein and adapted to enable user-side functionality. These are a priority list 87, a transfer detection module 89, a communication module 91, a log-in and position module 93, a user interface module 95 and a data input module 97. Priority list 87 is analogous to lists 53 and 59 of FIG. 2 except that it may be propagated to TS 67 (FIG. 3) in any data format that can be sent over the Internet. In this case, updating between priority lists is as simple as uploading the updated document or data. In one embodiment there is no list kept at TS 67 (list 81, 45*c*).

List 87 is automatically uploades to TS 67 each time a user logs in to the Internet. It is noted herein that list 87 is not limited to access numbers from a single ISP entity. There may be more than one ISP entity and associated numbers on one list 87. In this case, all listed ISPs and their associated access numbers may be considered during priority monitoring during a single data session initiated through one of the ISPs.

Transfer detection module 89 is analogous to transfer detection module 61 in SW 45*b* of FIG. 2 in an embodiment wherein CTI-switch 41 actually performs the connection transfer on behalf of a user. In an embodiment wherein a user will manually disconnect from a number and reconnect to a higher priority number upon notification, module 89 is not required. In one embodiment a user may configure the service of the present invention to function in automated transfer mode, or in manual transfer mode.

Communication module 91 is provided within SW 45*d* and adapted to enable node-to-node communication between a user receiving service and TS 67. Such communication may include service information, registration of product, configuration of the service, user information, and so on. User interface module 95 provides a graphic user interface for a user to remotely interact with the service including local interaction with aspects of application 45*d* installed locally on a user's machine (PC 37).

Log-in and position module 93 is analogous to the same module 65 described in FIG. 2 above. Module 93 maps the current network path of a user's browser at the time of disconnect from a current number. Upon re-connection and authentication using a new number, the browser will automatically re-navigate accordingly. The effect at user-side is a temporary "stall" in browser operation during the time after disconnect and before reconnect. If a network browser already has a capability of "remembering" the network mapping then module 93 is not required unless it is used to providing automated log-in. It is noted herein that automated log-in features "remember my password" of current Internet access applications may also be tapped to provide this service upon re-connection. An API would be required to initiate this feature after connection to a higher priority number is established.

Data input module 97 is provided and adapted to enable a user to input data for configuration, setting up a priority list, updating information into the service, and so on. Input module 97 may be adapted for traditional keyboard input, voice input, or both.

SW 45*c* resides at network level in TS 67 as previously described above. SW 45*c* contains a plurality of functional modules that enable the server-side function of the service. SW 45*c* comprises a priority list 81, a comparison module 85, a connection monitor 101, a proxy dialer module 99, a communication module 103 a navigation module 105, a ring detection module 107, and a notification module 109. Priority list 81 is analogous to list 87 of SW 45*d* and is presumed to be the network-level version of a user's priority list. List 81 may be updated through user initiation at any time. Comparison module 85 is adapted to work in conjunction with connection monitor 101 to compare priority ratings of the current user-connection number with ratings of other numbers in list 81. If there is one or more higher priority numbers found then the service activates.

Proxy dialer module 99 is adapted as a software dialer capable of dialing any telephone number and accessing the number through a network bridge or gateway as previously described. Proxy dialer module 99 represents a data-network-telephony (DNT)-to connection-oriented-switched-telephony (COST) dialing and connection capability through NI 40.

Connection monitor module 101 is adapted to note the current state of connection of a user to any one of CSs 47–51. In a preferred aspect of this embodiment TS 67 is immediately notified after user logs in to the Internet to one of ISP locations 17–21 as was described above. Therefore, once notified, connection monitor 101 continues to monitor connection status. It is noted herein, that the service of the present invention is active only when a user is connected. Therefore, if connection monitor 101 determines that a user has intentionally logged off during any point of service performance, then all activity and process on behalf of that user is terminated.

Communication module 103 is adapted for normal Internet communication and is identical to the communication module 91 described above. Navigation module 105 is adapted to enable TS 67 to navigate to any known server addresses of any listed connection server (CS) for monitoring purposes. Navigation module 105 also cooperates with notification module 109 to send notifications to subscribe users over various Internet paths.

Ring detection module 105 is adapted to cooperate with module 99 to detect if a higher priority ISP location is available and not busy. In this embodiment, TS 67 of FIG. 3 periodically calls each detected higher priority number during service performance. If a ringing event is detected, notification module 109 generates a notification that is communicated to the target user, in this case, operating PC 37 of FIG. 3.

In one embodiment, navigation module 105, in cooperation with communication module 103, determines availability states of higher priority ISP numbers by navigating through the Internet and checking each server for current mirrored status of associated ISP modem banks. In this case, proxy dialer module 99 and ring detection module 107 are not used. Also in this case, a user is simply notified of an available higher priority ISP number and makes a switch manually.

It will be apparent to one with skill in the art that the modules illustrated in applications 45d and 45c of this embodiment may be added to or subtracted from without departing from the spirit and scope of the present invention. For example, in one embodiment TS 67 utilizes modules 99 and 107 of SW 45c to place telephone calls and may in fact perform an automated call transfer on behalf of a user. In another embodiment described above, network communications used to detect ISP availability and no automated call transfers are performed. It will also be apparent to one with skill in the art that both embodiments may be packaged as service options configurable by users.

In still another embodiment of the present invention, an enhancement may be provided to enable users to switch among more than one ISP connection software used at one station according to detection of service performance of each ISP during any data session. Description of such an enhancement is provided below.

Priority Transfer Based on Service Performance (Bandwidth)

According to still another embodiment of the present invention, a dynamic system for transferring a Data Packet Network (DPN) connection from low quality (low bandwidth) connection to a higher quality (high bandwidth) connection during an active data session on a wide-area-network (WAN) is provided to subscribing users. This dynamic enhancement may be provided as an optional service that may be packaged in with the service of the present invention as described in FIGS. 1–4. Such an enhancement provides automated transfer of WAN-connected (Internet) clients from a low quality ISP provider to a higher quality ISP provider while a user is in session provided that the ISP provider software packages are installed on a client's station and adapted for integrated into the service software. Such a method and apparatus provides the capability to start a session using a ISP provider with limited or undependable bandwidth or other connection problems and be reasonably assured that he or she will soon be switched to a provider that is able to provide better quality service. In this embodiment a server application similar to one exemplified by SW 45c of FIG. 3 installed in TS 67 of FIG. 3 would be configured to monitor the quality of service (QoS) of any ISP provider while the user is logged on through the provider. The software application would monitor quality elements of the current server as well as quality elements of available servers in anticipation of switching the user to a higher quality ISP when appropriate. QoS elements that would be prioritized in this embodiment include such factors as: available bandwidth provided as a current estimation compared to current bandwidth through a users current ISP provider, history factors such as bandwidth stability over time generic to user-installed ISP services, and known telephony and network equipment characteristics related to various ISP entities.

Instead of focusing priority solely on ISP availability, automated transfers may be performed on behalf of users according to a more complex priority scheme which incorporates bandwidth monitoring, predictive elements derived from performance histories, and cost of operations in terms of local or long distance numbers to accessed. When the server-side application software monitoring the above-described quality factors determines a higher quality connection is available in relation to the user's current connection-activity, a signal is sent to the user's PC or Internet appliance and a transfer is effected wherein the Internet network mapping of the user's browser would be transferred to the appropriate "new" server of the alternate ISP promising better service. Of course, in this case the telephone number transfer is accomplished wherein the new telephone number is of a different ISP. As well, the new user name and password would have to be used for authentication purposes. Therefore, existing Internet access software applications already installed and configured to the host computer must be integrated through API to the service software residing on the host computer (user's station). In this manner a new connection and authentication could be made such that a user would not have to physically re-navigate back to the site and activity that was in progress at the transfer In the case of some downloads, one would probably have to reinitiate the download unless a user has a software application that would return to the last part of the download and finish the job that may have been interrupted during the transfer.

The method and apparatus of the present invention may be practiced via private individuals on the Internet, a private WAN, a communication center network a corporate WAN, and so on. Any type of known network typically accessible by a computer or other dial capable network appliance may be utilized; there are many customizable situations. The present invention as taught herein and above should be afforded the broadest of scope. The spirit and scope of the present invention is limited only by the claims that follow.

What is claimed is:

1. A network-based hardware and software system for enabling priority-based Internet access telephone number switching from a lower priority access number to a higher priority access number during a data session through monitoring current connection states of a user node connected to the network during session and comparing those states with current states of known alternate access numbers available to the user node during the network session, comprising:
   a CTI-switch for establishing call connections and performing call switching according to instruction formulated through the monitoring;
   a network-hosted part of a software application for monitoring the current user-node connection states and the current states of the alternate access numbers and for directing the CTI-switch function based on results of the monitoring;
   at least two network-access nodes connected to the network, the access nodes each accessible through dialing a network-access telephone number from the user node; and
   a client-hosted part of the software application for listing access numbers, configuring priority states to the access numbers based on priority characteristics of the access numbers including one or both of call connection cost and bandwidth characteristics, and for communicating the pertinent data to the network-hosted part of the software application, characterized in that a user connected to the network using a lower priority access number may continue the network session while a higher priority access number available to the user's node is identified from a list of alternate numbers through the monitoring performed by the network-hosted software application during the session, the identified number, also identified as currently accessible to the user's node, is either secured by the CTI-switch on behalf of the user, the user's node then disconnected and then re-connected to the secured number, or rendered to the user in a network notification after which, the user may manually disconnect and then re-connect to the available number.

2. The network-based system of claim 1, wherein the network accessible through the access numbers is the Internet network.

3. The network-based system of claim 2, wherein the Internet is access through a telephony network.

4. The network-based system of claim 3, wherein the telephony network is the public-switched-telephony-network (PSTN).

5. The network-based system of claim 4, wherein priority characteristics of the access numbers include at least the access and connection costs of using the numbers.

6. The network-based system of claim 5, wherein the lowest cost access number retains the highest priority, the priority ratings graduating down for each access number in a list of numbers, the highest cost access number retaining the lowest priority.

7. The network-based system of claim 6, wherein access numbers costing the same or exhibiting a negligible difference in cost to retain a same priority rating.

8. The network-based system of claim 4, wherein the priority characteristics of the access numbers include bandwidth characteristics of the associated network-access nodes.

9. The network-based system of claim 8, wherein a network-access number associated with a network-access node performing at higher bandwidth retains higher priority rating.

10. The network-based system of claim 4, wherein priority characteristics for a network-access number include both cost characteristics and bandwidth characteristics of the associated network-access server node.

11. The network-based system of claim 7, wherein the network-hosted part of the software application is hosted at the CTI-switch.

12. The network-based system of claim 11, wherein the client-hosted part of the software application communicates to the network-hosted part of the software application through a telephone-access number and interactive-voice-response interaction.

13. The network-based system of claim 7, wherein the network-hosted part of the software application is hosted by network-connected server node.

14. The network-based system of claim 13, wherein the network-hosted part of the software application communicates to the CTI switch through a network interface.

15. The network-based system of claim 14, wherein the network-hosted part of the software application communicates with the client-hosted part of the software application through an Internet path.

16. A software-control application for enabling priority-based Internet access telephone number switching from a lower priority access number to a higher priority access number during a data session conducted by a user connected to a data-packet-network through one of a list of available access numbers comprising:
   a network-hosted part of the software application for initiating and directing the priority-based number switching based on monitored results;
   a client-hosted part of the software application for configuring at least one access number list including associated priority characteristics including those of one or both of call connection cost and bandwidth, and communicating the listing characteristics to the network-hosted part of the software application; and
   a network-communication path between the client-hosted part of the software application and the network-hosted part of the software application, the network-communication path enabling bi-directional communication between the parts of the software application, characterized in that the data connection for a user engaged in a data session on the data-packet-network using a lower priority access number may during the session be switched according to software instruction from the connection using the lower priority access number to a connection using an identified higher priority access number during the same session without manual intervention required of the user.

17. The software-control application of claim 16, wherein the data-packet-network is the Internet network.

18. The software-control application of claim 17, wherein the user utilizes a personal computer for Internet connection using dial-up modem software.

19. The software-control application of claim 18, wherein the network-hosted part of the software application is hosted on a CTI telephony switch.

20. The software-control application of claim 19, wherein the network-hosted part of the application includes modules for monitoring a user connection, for storing and presenting a list of ISP-access numbers, for determining higher priority from the list, and for instructing the CTI telephone switch.

21. The software-control application of claim 18, wherein the network-hosted part of the software application is hosted on a network-connected server.

22. The software-control application of claim 21, wherein the network-hosted part of the software application includes modules for monitoring a user connection, for storing and presenting a list of ISP-access numbers, for determining higher priority from the list, for simulating an out-bound dialer, for Internet communication, for Internet navigation, for user notification, and for ringing-event detection.

23. The software-control application of claim 22, wherein the network-hosted part of the application controls CTI switch function through a network gateway.

24. The software-control application of claim 19, wherein the client-hosted part of the software application communicates to the network-hosted part of the software application through a telephone-access number and interactive-voice-response interaction.

25. The software-control application of claim 24, wherein the network-communication path is established through a telephony network using connection-oriented-switched-telephony lines.

26. The software-control application of claim 21 wherein the network-communication path is established through the Internet using Internet Protocols.

27. In an active data session conducted by a user operating a computerized node on a data-packet-network, a method for detecting an available higher priority Internet access telephone number from a list of known numbers and switching the connection of the computerized node to a connection using the higher priority access number during the session comprising steps of:
 (a) connecting the computerized node to the network using a lower priority number included in the list of known numbers;
 (b) identifying the current lower priority number in the list of known numbers;
 (c) comparing the priority assignment of the lower priority number with the priority assignments of other numbers in the list of known numbers;
 (d) identifying one or more higher priority numbers contained in the list of known numbers;
 (e) monitoring the identified higher priority numbers for one or both of connection cost and availability; and
 (f) upon detecting an available higher priority number, switching the current data session connection using the lower priority access number to a connection using the higher priority access number.

28. The method of claim 27, wherein the data-packet-network is the Internet network.

29. The method of claim 28 wherein in step (a), the computerized node is a personal computer accessing through an Internet Service Provider (ISP) and the list of access numbers comprise available alternative ISP numbers.

30. The method of claim 29 wherein in step (a), the listed access numbers represent numbers generic to more than one ISP.

31. The method of claim 29 wherein in step (b), identification is performed in a CTI telephony switch by CTI software.

32. The method of claim 29 wherein in step (b), identification is performed in an Internet server by server software.

33. The method of claim 31 wherein in step (c), comparison is performed by CTI software associated with the CTI telephony switch.

34. The method of claim 32 wherein in step (c), comparison is performed by the server software associated with the Internet server.

35. The method of claim 33 wherein in step (d), identification is performed by CTI software associated with the CTI telephony switch.

36. The method of claim 34 wherein in step (d), identification is performed by the server software associated with the Internet server.

37. The method of claim 29 wherein the priority states of each listed access number equate with cost of connection and operation of each number from the location of the personal computer.

38. The method of claim 35 wherein in step (e), monitoring includes calling the higher priority numbers periodically, the calls placed from the CTI telephony switch.

39. The method of claim 36 wherein in step (e), monitoring includes calling the higher priority numbers periodically, the calls placed from a CTI telephony switch and initiated from within the Internet server, the server communicating with the switch through a network gateway.

40. The method of claim 36 wherein in step (e), monitoring includes accessing connection servers associated with the higher priority access numbers, the connection servers providing availability status of the associated number.

41. The method of claim 40 wherein in step (e), the monitoring is performed by the server software associated with the Internet server.

42. The method of claim 41 wherein in step (f), notification is sent to the personal computer upon detecting a higher priority number and switching is performed according to user response.

* * * * *